United States Patent
Donate et al.

[11] Patent Number: 5,854,340
[45] Date of Patent: Dec. 29, 1998

[54] BLENDED AROMATIC AND DIETHER CONDENSATION POLYMERIZATION REFLUX SOLVENT

[75] Inventors: Felipe A. Donate, Midland; Joseph Warren Kappen, Saginaw; Debra Anne Timmers, Midland, all of Mich.

[73] Assignee: The Dow Chemical Company, Midland, Mich.

[21] Appl. No.: 936,211

[22] Filed: Sep. 24, 1997

Related U.S. Application Data

[63] Continuation-in-part of Ser. No. 926,943, Sep. 10, 1997.
[51] Int. Cl.$^6$ .............................. C08K 5/06; C08G 63/78
[52] U.S. Cl. .................... 524/755; 528/274; 528/308; 524/792; 524/794
[58] Field of Search ................................. 528/274, 308; 524/755, 792, 794

[56] References Cited

U.S. PATENT DOCUMENTS

| | | |
|---|---|---|
| 2,892,812 | 6/1959 | Helbing . |
| 3,325,428 | 6/1967 | Garver et al. . |
| 3,491,066 | 1/1970 | Petropoulos . |
| 4,554,343 | 11/1985 | Jackson, Jr. et al. ............... 528/274 |
| 5,346,986 | 9/1994 | Schneider et al. ............... 528/495 |
| 5,401,796 | 3/1995 | Kashima et al. ............... 524/706 |
| 5,428,126 | 6/1995 | Kashima et al. ............... 528/490 |
| 5,684,107 | 11/1997 | Schneider et al. ............... 526/303.1 |

FOREIGN PATENT DOCUMENTS

| | | |
|---|---|---|
| 207242 (B) | 10/1982 | Czechoslovakia . |
| 618249 (A2) | 4/1993 | European Pat. Off. . |
| 61078827 (A) | 9/1984 | Japan . |
| 62-215626 (A2) | 9/1987 | Japan . |
| 07278278 (A) | 4/1994 | Japan . |
| 759540 | 5/1978 | U.S.S.R. . |
| 1083520 | 9/1967 | United Kingdom . |

OTHER PUBLICATIONS

Material Safety Data Sheet, 92940652, Exxon Chemical Company, pp. 1–8, Nov. 22, 1997.

(List continued on next page.)

*Primary Examiner*—Samuel A. Acquah
*Attorney, Agent, or Firm*—Dale H. Schultz

[57] ABSTRACT

The present invention provides (a) a reflux solvent for condensation polymerization which is an admixture blend of a diether described by the formula $R_1$—O—$(CH_2$—$CHR_2$—$O)_n$—$R_1$ having a weight percentage between about 15 percent to about 60 percent (where $R_1$ is independently selected from $C_1$–$C_6$, $R_2$=$CH_3$ or $C_2H_5$, and n=1–3), and a second fluid which is an aromatic petroleum distillate solvent characterized as having an essential preponderance of aromatic distillates and having a boiling temperature between about 136° C. to about 232° C., where the admixture has an autoignition temperature greater than about 300° C. and the admixture does not solubilize water to above a concentration of about 2 weight percentage of water in the weight of the admixture and the water; (b) particular reflux solvent blends of dipropylene glycol dimethyl ether and aromatic petroleum distillate solvent as admixtures having a dipropylene glycol dimethyl ether percentage in excess of about 15 percent and less than about 60 percent; (c) a vaporous heterogeneous azeotrope generated when the solvent admixture is added to the environment of a condensation reaction and subsequently vaporized to remove water from the reaction environment in which the heterogeneous azeotrope is for the diether in a weight percentage between about 7 percent to about 20 percent of the azeotrope, water in a weight percentage between about 40 percent to about 60 percent of the azeotrope, and the aromatic petroleum distillate solvent as an essential third fluid; and (d) a method of preparing a polyester (e.g. an alkyd resin) using the steps of (1) reactively condensing together, in a reaction zone, an at least difunctional acid (or a reactive derivative thereof) and an at least difunctional alcohol (or a reactive derivative thereof) in the presence of one of the reflux solvents, and (2) azeotropically distilling from the reaction zone the reflux solvent and any water formed from the condensation reaction.

24 Claims, 4 Drawing Sheets

DPGDME: COSOLVENT BLEND

OTHER PUBLICATIONS

Material Safety Data Sheet, 92942653, Exxon Chemical Company, pp. 1–7, Nov. 20, 1997.

Material Safety Data Sheet, 7.865, Shell Oil Company pp. 1–7, Jun. 25, 1997.

Material Safety Data Sheet, 999.0004323–008.008, Ashland Chemical Company, pp. 1–12, Jan. 26, 1998.

Material Safety Data Sheet 301.0000563–004.006, Ashland Chemical Company, pp. 1–10, Jan. 26, 1998.

Material Data Sheet, 7.866, Shell Oil Company, Jul. 9, 1997, pp. 1–6.

Panasol Aromatic Solvents Sales Specification and Physical Properties, Amoco Chemicals, Jul. 9, 1997, pp. 1–6.

Hydrocarbon Solvents, Fina Oil and Chemical Company, Jan. 1, 1997, pp. 1–3.

*Standard Test Method for Autoignition Temperature of Liquid Chemicals*, American Society For Testing and Materials, Designation: E 659–78 (Reapproved 1994), pp. 1–4.

*Standard Test Method for Water Using Volumetric Karl Fischer Titration*, American Society For Testing and Materials, Designation: E 203–96, pp. 1–8.

*Azeotropic Data*, American Chemical Society, Jun. 1952, p. 11.

*Azeotropic Data*, American Chemical Society, Jun. 1952, p. 10.

D. Zinkweg, *New Glycol Diether Helps Cut VOCs in Water–Based Polyurethane Coatings*, Paint & Coatings Industry (0884–3848), Business News Publishing Company, Troy, Michigan, Mar. 1996.

H. Goldsmith, *Alpha–and Beta–Hydroxyls of Glycerol in Preparation of Alkyd Resins*, Industrial and Engineering Chemistry, Jul. 1948, pp. 1205–1211.

*Raw Materials and Their Usage*, Surface Coatings, vol. 1, Chapman and Hall, London and New York, pp. 53, 65, 67, 70, 72–73.

K. Holmberg, *High Solids Alkyd Resins*, Marcel Dekker, Inc., New York, New York, 1987, pp. 18, 47–48, 52, 77, 78, 94–101.

BLENDED AROMATIC AND DIETHER CONDENSATION POLYMERIZATION REFLUX SOLVENT

CROSS-REFERENCE TO RELATED APPLICATION

This application is a continuation-in-part of an original application Ser. No. 08/926,943 entitled "BLENDED AROMATIC AND DIETHER CONDENSATION POLYMERIZATION REFLUX SOLVENT" filed on Sep. 10, 1997 with Express Mail Label No. EM080819499US and having the following inventors: Felipe A. Donate, Debra Anne Timmers, Joseph Warren Kappen.

FIELD OF THE INVENTION

This invention relates to a solvent blend of diether described by the formula $R_1$—O—$(CH_2$—$CHR_2$—O$)_n$—$R_1$ (where $R_1$ is independently selected from $C_1$–$C_6$, $R_2$=$CH_3$ or $C_2H_5$, and n=1–3 such as an alkyl diether of dipropylene glycol) and a high-boiling aromatic hydrocarbon mixture and to a subsequent azeotrope formed by combining the solvent blend with water and vaporizing the water-solvent combination. The vapor so created is effectively a ternary heterogeneous azeotrope (hetero-azeotrope) of aromatic petroleum distillate solvent, water, and alkyl diether. The solvent blend has beneficial attributes of limited water solubility and a relatively high autoignition temperature. Additionally the solvent admixture contains less than 5% by weight of materials of concern with respect to Clean Air Act Hazardous Air Pollutant regulation in the United States of America. These properties of the solvent admixture render it especially useful in solvent reflux preparation methods for alkyd and polyester resins, applications where xylene, a solvent of concern as a Hazardous Air Pollutant (HAP), has traditionally been used. A useful component in one solvent admixture of the present invention is dipropylene glycol dimethyl ether (DPGDME) in either neat or blended stereoisomeric composition.

BACKGROUND OF THE INVENTION

The use of xylene and other organic solvents to remove water in condensation polymerization reactions by use of azeotropic distillation is well known. Krister Holmberg notes on page 47 of "High Solids Alkyd Resins" (Marcel Dekker, New York, 1987):

"Polyesters may be prepared either by direct condensation of at least difunctional acids and at least difunctional alcohols, or by employing reactive derivatives of the acid or the alcohol component. The first type of reaction is reversible, and in order to shift the equilibrium towards the product side, the water formed must be removed from the reaction zone. In practice, such removal may be carried out in various ways, such as azeotropic distillation using an organic solvent, sweeping the vapor away by means of a stream of inert gas, or by applying a vacuum." Holmberg further notes (Supra, page 18), "The term 'alkyd' . . . is derived from 'al' of alcohol and 'cid' of acid; 'cid' was later changed to 'kyd'. Alkyd resins in a broad sense refer to polyesters. By convention, however, polyesters with unsaturation in the backbone are not referred to as alkyd but are termed 'unsaturated polyesters'. There is a great deal of confusion regarding the terminology. The term alkyd is sometimes used in a restrictive manner to describe only fatty acid modified polyesters, and the nonmodified resins are then called saturated polyesters." Holmberg further notes (Supra, page 52), "In commercial alkyd synthesis ideal reactions between bifunctional reagents never occur. First of all, starting materials of both higher and lower functionality than two are often employed. Furthermore, various side reactions, as well as the fact that the actual reactivity of the functional groups depends on their chemical environment, must be taken into account. Nevertheless, the theory of polyesterification . . . plays an important role in modem alkyd synthesis." Alkyds are a special type of polyester that usually include a fatty acid; alkyd resins are also a special type of polyester that include the products of a condensation polymerization of a dihydric or polyhydric alcohol (e.g. ethylene glycol or glycerol) and a polybasic acid (e.g. phthalic anhydride or isophthalic acid).

Examples of at least difunctional acids in the foregoing are: adipic acid, maleic acid, phthalic acid, isophthalic acid (meta), succinic acid, fumaric acid, and terephthalic acid (para). Examples of derivatives of at least difunctional acids in the foregoing are: maleic anhydride, phthalic anhydride (ortho), trimellitic anhydride, and tetrahydrophthalic anhydride. Examples of at least difunctional alcohols in the foregoing are: ethylene glycol; propylene glycol; neopentyl glycol; diethylene glycol; dipropylene glycol; 1,4-cyclohexanedimethanol; triethylene glycol; 2,2,4-trimethyl-1,3-pentanediol; bisphenol A; glycerol; trimethylolethane; trimethylolpropane; pentaerythritol; and dimethylolpropionic acid. Examples of fatty acids in the foregoing are: linoleic (9,12-octadecadienoic acid or 10,12 octadecadienoic acid), linolenic (9,12,15-octadecatrienoic acid), myristic (tetradecanoic acid), oleic (9-octadecenoic acid), palmitoleic (9-hexadecenoic acid), and stearic (octadecanoic acid). A number of the fatty acids are present in vegetable oils such as corn oil, cottonseed oil, linseed oil, olive oil, palm oil, peanut oil, safflower oil, soybean oil, sunflower oil, sugarcane oil, and tung oil. (Supra, pages 94, 95, 96, 98, 99, and 101).

Another reference from the literature, Chapter Six (entitled "Manufacture of Alkyd Resins") from "Surface Coatings, Volume 1—Raw Materials and Their Usage" by The Oil and Colour Chemists' Association, Australia (Tafe Educational Books; Kensington, Australia, 1983), pages 65 to 74, describes a standard manufacturing system for manufacture of alkyd resins where azeotropic distillation is employed. This publication is hereby incorporated by reference herein in the description of the background of the present invention as if fully set forth.

Condensation polymerization reactions are usually conducted at a temperature which is between about 225° C. to about 275° C. in a nitrogen-padded reactor equipped with a condenser and a water trap. The use of reflux solvent having a weight percent in the reactor contents of between about 3 weight percent to about 10 weight percent prevents fouling of both the top section of the reactor and the attached condenser. In some cases, the reflux solvent may also promote a faster reaction rate in the reactor by (1) solubilizing the reactants and (2) by facilitating the continuous removal of water (in the form of a vaporous water and solvent mixture) from the reactant-product mixture in the reactor. The mixture of water and reflux solvent so removed from the reactor is then condensed and separated into two layers so that the reflux solvent can be separated from the water and subsequently returned (essentially at its original composition) back to the reactor. Reflux solvent recycling is therefore achieved through a reflux solvent process cycle of (1) reflux solvent use and distillation, (2) separation-purification-recovery, and (3) return which is executed in cooperative conjunction with the condensation polymerization process being executed in the reactor.

Preferable properties in a reflux solvent used in this manner are (a) chemical inertness respective to the substances in the reactor (aproticity for the reactions of interest), (b) thermal stability in the range of temperatures for which the reaction is run (in this case at temperatures within a range from above about 200° C. and less than about 250° C.), (c) reasonable volatility, (d) good solvency (in that the reflux solvent will solubilize the monomers as well as the products of the reaction), (e) low miscibility with water (less than about ten percent at the temperatures at which the reflux solvent is condensed and separated into two layers), and (f) the ability to form an azeotrope with water which demonstrates a boiling point lower in temperature than the boiling point of any of the isolated components in the azeotrope.

As should be apparent from the foregoing, another desirable feature of a reflux solvent is sometimes termed to be "a good recycling characteristic"; this means that the properties (e.g., limited water solubility) of the reflux solvent will conveniently facilitate an efficient recovery process. Limited water solubility enables separation of the heterogeneous-azeotropic mixture of vaporous water and reflux solvent (removed from the condensation polymerization) into water and recovered reflux solvent through the use of a straightforward process such as condensing and decanting without need for an additional recycling process step. (Examples of such additional steps, when DPGDME is used in neat form as a reflux solvent, are either the step of blending salt into the water-and-DPGDME distilled from the reactor in order to create a decantable brine-and-DPGDME mixture or the step of heating the condensed water and DPGDME to decrease the solubility of DPGDMG in the water which will be discharged. As should be apparent, such a step generates additional costs respective to processing, raw materials, and environmental handling when measured against a method using a reflux solvent which has low water solubility). Tradeoffs between the innate properties in any reflux solvent and the desired properties are at the core of the essential dilemma in defining the most efficient reflux solvent for any particular condensation reaction or condensation polymerization reaction.

Although used as a reflux solvent for many years, xylene is regulated as a HAP material (as previously noted) and also has relatively poor compatibility with isophthalic acid, a compound widely used in the preparation of alkyds and polyesters. Additionally, xylene is marginally effective as a solvent in preventing "carryover" of isophthalic acid in the vaporous mixture of water and reflux solvent removed from the reaction environment during the course of a condensation polymerization reaction; isophthalic acid thus removed from the reaction environment also will cause fouling of the condensation polymerization apparatus as the limited solubility of isophthalic acid in the xylene precludes incorporation of the isophthalic acid into the vaporous water and reflux solvent mixture.

Methyl isobutyl ketone has also been used as a reflux solvent in some condensation reactions, but is also regulated as a HAP material.

Aliphatic and aromatic hydrocarbon blends, such as Isopar G (a high-purity isoparaffinic product of Exxon Company, USA of Houston, Tex.) and Aromatic 100 (also a product of Exxon Company, USA), have also been used as reflux solvents since they have the benefit of not being regulated as HAP materials; but these materials exhibit relatively poor compatibility with isophthalic acid.

Dipropylene glycol dimethyl ether is not regulated as a HAP material and has also been used as a reflux solvent; however, DPGDME has a relatively low autoignition temperature of 165° C. (at pressures used in the condensation polymerization reactions of interest), and DPGDME also shows significant solubility in water. These properties are of concern respective to safety and also establish a poor recycling characteristic status since (1) DPGDME is lost with discharged water or (2) the use of DPGDME as the sole reflux solvent indicates a brine discharge instead of a water discharge from the reflux solvent process cycle when an additional step of salt addition to the water to create the aforementioned brine-DPGDME mixture is used to enable recovery of the DPGDME. Ideally, autoignition temperatures of greater than 300° C. are desired respective to safety in general condensation polymerization operations.

Although each of the alternatives discussed above enable benefit in condensation polymerization reactions, what is truly needed is a reflux solvent which demonstrates (in and respective to condensation reactions in general and for condensation polymerization reactions in particular) chemical inertness, temperature stability, reasonable volatility, good solvency (in that the desired reflux solvent will solubilize the monomers as well as the products of the reaction), good recycling properties (especially a property of low solubility with water), and the ability to form an azeotrope with water which demonstrates a boiling point which is lower in temperature than the boiling point of any of the phases in the azeotrope. The present invention provides a set of such new reflux solvents, a method of preparing the new reflux solvents as admixtures, heterogeneous azeotropes formed when water is added to the new reflux solvents, and new methods for preparing polyester resins (e.g. alkyd resins) using the new reflux solvents.

SUMMARY OF THE INVENTION

The present invention solves the problem of providing a reflux solvent for condensation polymerization by providing an admixture blend of a diether described by the formula $R_1$—O—$(CH_2$—$CHR_2$—O$)_n$—$R_1$ having a weight percentage between about 15 percent to about 60 percent, where $R_1$ is independently selected from $C_1$–$C_6$, $R_2$=$CH_3$ or $C_2H_5$, and n=1–3; and a second fluid which is an aromatic petroleum distillate solvent characterized as having an essential preponderance of aromatic distillates and having a boiling temperature between about 136° C. to about 232° C.; and where the admixture has an autoignition temperature greater than about 300° C. and the admixture does not solubilize water to above a concentration of about 2 weight percentage of water in the weight of the admixture and the water. In one solution according to the above, the present invention provides a reflux solvent for condensation polymerization by providing a blend of dipropylene glycol dimethyl ether and an aromatic petroleum distillate solvent as an admixture having a dipropylene glycol dimethyl ether percentage in excess of about 15 percent and less than about 60 percent. The aromatic petroleum distillate solvent has a boiling temperature between about 136° C. to about 232° C. While efforts respective to the solvent admixture of the present invention have been focused on condensation polymerization applications, the inventors perceive that the usefulness of the solvent admixture should reasonably extend to other condensation reactions where removal of water from the reaction environment is beneficial in enabling the reaction of interest. The heterogeneous azeotrope of the present invention is generated when the solvent admixture is added to the environment of a condensation reaction and subsequently vaporized to remove water from the condensation reaction environment. In this regard the present invention is for a heterogeneous azeotrope having: (1) dipropylene glycol dimethyl ether in a weight percentage between about 7 percent to about 20 percent of the azeotrope; (2) water in a weight percentage between about 40 percent to about 60 percent of the azeotrope; and (3) an aromatic petroleum distillate solvent as an essential third fluid having an essential preponderance of aromatic distillates and having a boiling temperature between about 136° C. to about 232° C. In another aspect, the invention is for a heterogeneous azeotrope of dipropylene glycol dimethyl ether in a weight percentage between about 7 percent to about 20 percent of the azeotrope; (2) water in a weight percentage between about 40 percent to about 60 percent of the azeotrope; and (3) a third fluid selected from the group consisting of propylbenzene; 1-ethyl-3-methylbenzene; 1-ethyl-4-methylbenzene; mesitylene; 1-ethyl-2-methylbenzene; 1,2,4-trimethylbenzene; tert-butylbenzene; 1,2,3-trimethylbenzene; isobutylbenzene; m-cymene; sec-butylbenzene; p-cymene; o-isopropyltoluene; 1,2-diethylbenzene; butylbenzene; 1,4-diethylbenzene; 2,5-dimethylcumene; 1,2,4,5-tetramethylbenzene; and 1,2,3,5-tetramethylbenzene. In application, the invention provides a method of preparing a polyester using the steps of (1) reactively condensing together, in a reaction zone, an at least difunctional acid (or a reactive derivative thereof) and an at least difunctional alcohol (or a reactive derivative thereof) in the presence of one of the condensation polymerization reflux solvents described above; and (2) azeotropically distilling from the reaction zone the reflux solvent and any water formed from the condensation reaction. The invention provides a method for manufacturing alkyd resins where a reactive derivative of the at least difunctional acid and the at least difunctional alcohol are reactively condensed together—most usually when a dihydric or polyhydric alcohol and a polybasic acid (e.g. phthalic anhydride or isophthalic acid) are reactively condensed together. The DPGDME can be used in either neat or blended stereoisomeric composition; specific stereoisomers of interest and best utility respective to the present invention are In blended DPGDME stereoisomeric compositions of the present invention, the preponderant stereoisomers of preference are also

DETAILED DESCRIPTION OF THE INVENTION

Examples of aromatic petroleum distillate solvents useful in the above reflux solvent admixtures are (a) Aromatic 100 (C8–C10, mainly C9, less than 5% xylene) and (b) Aromatic 150 (C9–C11, mainly C10). Both Aromatic 100 and Aromatic 150 are aromatic petroleum distillate solvent products of Exxon Company, USA of Houston, Tex. Admixtures of these solvents and dipropylene glycol dimethyl ether form condensation polymerization reflux solvents having autoignition temperatures in excess of 300° C. It should be noted that, unlike other physical properties, autoignition temperatures cannot be accurately predicted; and, in this regard, an unexpected synergistic effect has been discovered in these admixtures respective to the autoignition temperature property. In addition, these admixtures are significantly less soluble in water at 25° C. than neat dipropylene glycol dimethyl ether (a second unexpected synergistic effect that has been discovered in these admixtures respective to the water solubility property). This significantly lower solubility is indicated by a lower concentration of dipropylene glycol dimethyl ether in the water layer as measured in a series of solubility experiments (note that hydrocarbons have negligible solubility in water) whose results are shown in Table 1.

TABLE 1

Autoignition Temperature and Water Solubility Measurements

| Solvent Blend | Autoignition temperature °C. | DPGDME (wt. % in blend) | Solubility @ 25° C. (wt. % DPGDME in water) | Solubility @ 25° C. (wt. % water in solvent) |
|---|---|---|---|---|
| DPGDME (neat) | 165 | 100 | 35.0 | 5.0 |
| Aromatic 100/ DPGDME (1/1) | 358 | 50 | 16.7 | 0.7 |
| Aromatic 100/ DPGDME (2/1) | N.A. | 33 | 15.3 | 0.4 |
| Aromatic 100/ DPGDME (3/1) | 418 | 25 | 8.4 | 0.2 |
| Aromatic 150/ | 321 | 50 | 17.1 | 0.7 |

TABLE 1-continued

Autoignition Temperature and Water Solubility Measurements

| Solvent Blend | Autoignition temperature °C. | DPGDME (wt. % in blend) | Solubility @ 25° C. (wt. % DPGDME in water) | Solubility @ 25° C. (wt. % water in solvent) |
|---|---|---|---|---|
| DPGDME (1/1) | | | | |
| Aromatic 150/ DPGDME (2/1) | N.A. | 33 | 15.6 | 0.4 |
| Aromatic 150/ DPGDME (3/1) | N.A. | 25 | 11.5 | 0.3 |

Note 1 - Autoignition temperatures were measured by ASTM Method E659.
Note 2 - In the solubility experiments, 10 g mixtures were shaken with 3 g water and then allowed to stand until the two layers were clear. The water layers were sampled and analyzed by capillary gas chromatography to determine the solvent concentration. Samples of the solvent layer were titrated by the Karl Fischer method (ASTM Method E203-96) to obtain water concentrations.
Note 3 - N.A. means that data was not taken.

The solubility of water in the dipropylene glycol dimethyl ether layer is also clearly reduced in the presence of the aromatic solvents (see Table 1). It is anticipated that the blends still retain the high affinity for isophthalic acid imparted by the DPGDME since (a) DPGDME has traditionally functioned as a viscosity reducing solvent and (b) because the composition of the azeotrope (formed from combining the solvent blend with water and vaporizing the water-solvent combination) functions to further concentrate DPGDME in the condensation polymerization environment as the reaction proceeds toward completion.

Combinations of (a) water, (b) dipropylene glycol dimethyl ether, and (c) the aromatic petroleum distillate solvent effectively vaporize (from the reaction zone in application) to a ternary heterogeneous azeotrope. Experiments conducted with the blends of Table 1 indicate that the set of azeotropes respective to the blends of that table vaporize at 97°–98° C. and have a composition of (a) about 35 percent Aromatic 100, 50 percent water, and 15 percent DPGDME for a reflux solvent prepared at a ratio of 1/1 Aromatic 100/DPGDME and (b) a composition of about 44 percent Aromatic 100, 48 percent water, and 8 percent DPGDME for a reflux solvent prepared at a ratio of 3/1 Aromatic 100/ DPGDME. These data demonstrate unexpected and beneficial azeotropic compositions which have the effect of "allowing" DPGDME to remain in the reaction zone of the reactor in a beneficially sufficient concentration to augment compatibility of the polyester reactants (especially isophthalic acid) even as more water is removed from the reaction zone per amount of distilled solvent than generally was removed by previous solvents. (As noted in "Azeotropic Data"—No. 6 of the "Advance In Chemistry Series" published by the American Chemical Society in 1952, meta-xylene azeotropes with water at 36 percent water, and methyl isobutyl ketone azeotropes with water at 24 percent water.) Because of the low solubility of water in the heterogeneous azeotrope, the reflux solvent layer (the effectively recovered admixture) is recycled back to the reactor after essentially all the water of reaction has been removed; in this regard, essentially all of the DPGDME/Aromatic 100 admixture is recovered for reuse with little change in admixture composition. The admixture also beneficially provides a viscosity-reducing solvent for the final products as (1) DPGDME has traditionally functioned as a viscosity reducing solvent and (2) the composition of the azeotrope formed (from combining the solvent blend with water and vaporizing the water-solvent combination) functions to further concentrate DPGDME in the condensation polymerization environment as the reaction proceeds toward completion. DPGDME can be used in either neat or blended stereoisomeric composition; specific stereoisomers of interest and best utility respective to the present invention are In blended DPGDME stereoisomeric compositions of the present invention, the preponderant stereoisomers of preference are In addition to dipropylene glycol dimethyl ether, other diethers described by the formula $R_1$—O—$(CH_2$—$CHR_2$—$O)_n$—$R_1$ where $R_1$ is independently selected from $C_1$–$C_6$, $R_2$=$CH_3$ or $C_2H_5$, and n=1–3, are suggested for consideration in condensation reactions when the resulting admixtures demonstrate the benefits of an autoignition temperature greater than about 300° C. and the admixtures do not solubilize water to above a concentration of about 2 weight percentage of water in the combined weight of the admixture and the water.

Alternative aromatic petroleum distillate solvents have also been identified from computer modeling exercises. In this regard, propylbenzene; 1-ethyl-3-methylbenzene; 1-ethyl-4-methylbenzene; mesitylene; 1-ethyl-2-methylbenzene; 1,2,4-trimethylbenzene; tert-butylbenzene; 1,2,3-trimethylbenzene; isobutylbenzene; m-cymene; sec-butylbenzene; p-cymene; o-isopropyltoluene; 1,2-diethylbenzene; butylbenzene; 1,4-diethylbenzene; 2,5-dimethylcumene; 1,2,4,5-tetramethylbenzene; 1,2,3,5-tetramethylbenzene; and blends of two or more of these compounds all should also demonstrate similar beneficial heterogeneous azeotropic characteristics in forming water, diether (described by the formula $R_1$—O—$(CH_2$—$CHR_2$—O$)_n$—$R_1$ where $R_1$ is independently selected from $C_1$–$C_6$, $R_2$=$CH_3$ or $C_2H_5$, and n=1–3 such as dipropylene glycol dimethyl ether), and solvent azeotropes when substituted for the aromatic petroleum distillate solvents previously discussed based on their predicted solubility and autoignition properties.

In addition to Aromatic 100, other commercially available aromatic petroleum distillate solvents boiling in the 136°–232° C. range can also be used in the present invention. Some of these other solvents are indicated in Table 2.

TABLE 2

Alternative Commercially Available
Aromatic Petroleum Distillate Solvents

| Blend | Typical Working Boiling Point Range in °C. |
|---|---|
| Exxon Aromatic 100 | 156–171 |
| Shell Cyclo-Sol 100 | 160–177 |
| Amoco Panasol 130 | 149–202 |
| Ashland Hi-Sol 10 | 152–177 |
| Exxon Aromatic 150 | 185–206 |
| Shell Cyclo-Sol 150 | 179–216 |
| Fina 150 | 168–204 |
| Ashland Hi-Sol 15 | 177–216 |

As previously noted, Aromatic 100 and Aromatic 150 are aromatic petroleum distillate solvent products of Exxon Company, USA of Houston, Tex. Cyclo-Sol 100 and Cyclo-Sol 150 are products of Shell Oil Company of Houston, Tex. Panasol 130 is a product of Amoco Chemical Company of Chicago, Ill. Hi-Sol 10 and Hi-Sol 15 are products of Ashland Chemical Company of Russell, Ky. Fina 150 is a product of Fina Oil and Chemical Company of Dallas, Tex.

Respective to the foregoing, a preferable working boiling point range for the aromatic petroleum distillate solvent is 136°–232° C., with the most preferable boiling range for aromatic petroleum distillate being 140°–180° C. The presence of some impurities or the addition of other solvents or solvent blends to subtly change the character of the admixtures of the present invention will not preclude utility of the present invention; one example in this regard is the addition of an isoparaffinic (aliphatic) solvent boiling in the same range. It should be noted, however, that beneficial characteristics in the reflux solvent admixture blend respective to autoignition temperature will be increasingly compromised with such compositional changes (especially when more than 10 percent by weight of aliphatic solvent in the admixture is present).

EXAMPLES AND EXPERIMENTAL DATA

Distillation and Separation Examples

Measurements respective to the behavior of the reflux solvent admixtures as they are used in condensation polymerizations are indicated in Tables 3 and 4 and in FIGS. 1, 2, 3, and 4. Results from two exemplary distillations of the solvent blends in the presence of water are presented in Table 3 and Table 4. Measured data for a distillation where the solvent blend is at a 1:1 ratio (Aromatic 100:DPGDME) is indicated in Table 3. Measured data for the distillation of a 3:1 solvent blend (Aromatic 100:DPGDME) is indicated in Table 4. Incremental samples (cuts) were taken of the distillate overheads in amounts as noted in the tables and compositions were measured using gas chromatography. Water concentrations were determined by the Karl Fischer method (ASTM Method E203-96).

Distillation Procedure

The apparatus for distillation of the solvent mixtures consisted of a 250-ml three-neck flask equipped with a thermocouple well, a heating mantle, a glass stopper, a nitrogen adapter with a stopcock valve, a magnetic stirrer and stir bar, and a single-piece distillation unit. The distillation unit included a distillation head; an overhead condenser; a fraction cutter with nitrogen purge intake and oil bubbler; and a graduated water trap with a stopcock located at the bottom. The nitrogen adapter on the flask and the nitrogen intake on the distillation unit were connected to the same nitrogen line.

The reactor was first purged with nitrogen for 10 minutes by opening the stopcock valve in the nitrogen adapter. The glass stopper was removed while still purging the flask with nitrogen, and 100 g of the DPGDME/Aromatic 100 solvent blend, and 30 g water were added. The stopper was repositioned and the stopcock valve in the nitrogen adapter closed in order to establish a nitrogen blanket in the apparatus through the nitrogen intake/bubbler assembly in the distillation unit. The magnetic stirrer was turned on. The heating mantle was connected to a temperature controller and an affiliated control thermocouple placed inside the thermocouple well. The temperature controller was activated and a setpoint of 175° C. was defined for the region of the flask being measured by the thermocouple. A first drop of distillate was detected when the flask temperature reached about 170° C., with an overheads temperature of 160° C. These two temperatures were recorded each time a fraction was collected. Each fraction, comprising 5–10 ml distillate, was drained, weighed, and then analyzed for its constituents. All fractions containing water separated into two layers in the trap. For these fractions, each layer was individually drained and then weighed and analyzed. The distillation was discontinued when 100 ml distillate had been collected. At least ten fractions were collected for analysis in each of the two exemplary distillations. Steady-state overheads temperatures in both cases were in the 165°–169° C. range throughout the course of the distillation. (Note—"N.A." in the tables means that data was not taken; A100 stands for Aromatic 100).

TABLE 3

1:1 Reflux Solvent Admixture And Water Distillation Data

| Sample # | % DPGDME | % DPGDME start | % water | % A100 | WT. of cut (g) | Wt. of total cut (g) | Total wt. water (g) | Total wt. DPGDME (g) | Total wt. A100 (g) | Total % Water | Total % DPGDME | Total % A100 |
|---|---|---|---|---|---|---|---|---|---|---|---|---|
| #1 bottom | 2.87 | 50 | 97.13 | 0.00 | 2.42 | 4.94 | 2.36 | 0.74 | 1.85 | 47.71 | 14.92 | 37.38 |
| #1 top | 26.48 | 50 | 0.25 | 73.27 | 2.52 | | | | | | | |
| #2 bottom | 3.22 | 50 | 96.78 | 0.00 | 2.65 | 5.07 | 2.57 | 0.73 | 1.77 | 50.72 | 14.46 | 34.82 |
| #2 top | 26.76 | 50 | 0.29 | 72.95 | 2.42 | | | | | | | |
| #3 bottom | 2.91 | 50 | 97.09 | 0.00 | 3.47 | 8.11 | 3.38 | N.A. | N.A. | 41.69 | N.A. | N.A. |
| #3 top | N.A. | 50 | 0.26 | N.A. | 4.64 | | | | | | | |
| #4 bottom | 3.49 | 50 | 96.51 | 0.00 | 4.10 | 8.05 | 3.97 | 1.26 | 2.82 | 49.29 | 15.62 | 35.09 |
| #4 top | 28.20 | 50 | 0.28 | 71.52 | 3.95 | | | | | | | |
| #5 bottom | 3.47 | 50 | 96.53 | 0.00 | 4.26 | 8.18 | 4.12 | 1.28 | 2.78 | 50.37 | 15.61 | 34.02 |
| #5 top | 28.81 | 50 | 0.21 | 70.98 | 3.92 | | | | | | | |
| #6 bottom | 3.28 | 50 | 96.72 | 0.00 | 4.33 | 8.38 | 4.20 | 1.33 | 2.85 | 50.11 | 15.84 | 34.05 |
| #6 top | 29.27 | 50 | 0.28 | 70.45 | 4.05 | | | | | | | |
| #7 bottom | 3.52 | 50 | 96.48 | 0.00 | 4.11 | 8.13 | 3.98 | 1.40 | 2.76 | 48.93 | 17.17 | 33.90 |
| #7 top | 31.13 | 50 | 0.31 | 68.56 | 4.02 | | | | | | | |
| #8 bottom | 3.96 | 50 | 96.04 | 0.00 | 4.14 | 8.14 | 3.99 | 1.27 | 2.88 | 49.00 | 15.56 | 35.44 |
| #8 top | 27.57 | 50 | 0.31 | 72.12 | 4.00 | | | | | | | |
| #9 bottom | 3.97 | 50 | 96.03 | 0.00 | 4.19 | 8.13 | 4.04 | 1.49 | 2.60 | 49.66 | 18.33 | 32.01 |
| #9 top | 33.60 | 50 | 0.34 | 66.06 | 3.94 | | | | | | | |
| #10 bottom | 4.49 | 50 | 95.51 | 0.00 | 4.93 | 8.40 | 4.72 | 1.35 | 2.33 | 56.20 | 16.08 | 27.73 |
| #10 top | 32.53 | 50 | 0.35 | 67.12 | 3.47 | | | | | | | |
| #11 bottom | 4.46 | 50 | 95.54 | 0.00 | 4.05 | 8.08 | 3.88 | 1.51 | 2.69 | 48.05 | 18.63 | 33.32 |
| #11 top | 32.87 | 50 | 0.33 | 66.81 | 4.03 | | | | | | | |
| #12 bottom | 6.49 | 50 | 93.51 | 0.00 | 3.76 | 8.02 | 3.53 | 1.65 | 2.84 | 44.00 | 20.57 | 35.43 |
| #12 top | 33.00 | 50 | 0.30 | 66.70 | 4.26 | | | | | | | |

TABLE 4

3:1 Reflux Solvent Admixture And Water Distillation Data

| Sample # | % DPGDME | % DPGDME start | % water | % A100 | WT. of cut (g) | Wt. of total cut (g) | Total wt. water (g) | Total wt. DPGDME (g) | Total wt. A100 (g) | Total % Water | Total % DPGDME | Total % A100 |
|---|---|---|---|---|---|---|---|---|---|---|---|---|
| #1 bottom | 1.75 | 25 | 98.25 | 0.00 | 2.40 | 5.74 | 2.36 | 0.50 | 2.88 | 41.18 | 8.63 | 50.19 |
| #1 top | 13.57 | 25 | 0.17 | 86.26 | 3.34 | | | | | | | |
| #2 bottom | 1.97 | 25 | 98.03 | 0.00 | 2.22 | 5.03 | 2.18 | 0.41 | 2.44 | 43.36 | 8.15 | 48.50 |
| #2 top | 13.03 | 25 | 0.16 | 86.81 | 2.81 | | | | | | | |
| #3 bottom | 2.23 | 25 | 97.77 | 0.00 | 2.30 | 4.94 | 2.25 | 0.44 | 2.25 | 45.59 | 8.85 | 45.56 |
| #3 top | 14.62 | 25 | 0.13 | 85.26 | 2.64 | | | | | | | |
| #4 bottom | 2.03 | 25 | 97.97 | 0.00 | 2.72 | 5.04 | 2.67 | 0.37 | 2.00 | 52.94 | 7.34 | 39.72 |
| #4 top | 13.57 | 25 | 0.15 | 86.29 | 2.32 | | | | | | | |
| #5 bottom | 1.82 | 25 | 98.18 | 0.00 | 2.39 | 4.89 | 2.35 | 0.39 | 2.15 | 48.05 | 7.94 | 44.00 |
| #5 top | 13.79 | 25 | 0.14 | 86.07 | 2.50 | | | | | | | |
| #6 bottom | 3.68 | 25 | 96.32 | 0.00 | 2.46 | 4.98 | 2.37 | 0.42 | 2.19 | 47.65 | 8.40 | 43.94 |
| #6 top | 13.01 | 25 | 0.15 | 86.84 | 2.52 | | | | | | | |
| #7 bottom | N.A. | 25 | N.A. | 0.00 | 2.34 | 4.96 | N.A. | N.A. | 2.22 | N.A. | N.A. | 44.68 |
| #7 top | 15.26 | 25 | 0.16 | 84.58 | 2.62 | | | | | | | |
| #8 bottom | 3.04 | 25 | 96.96 | 0.00 | 2.45 | 4.54 | 2.38 | 0.40 | 1.76 | 52.39 | 8.86 | 38.75 |
| #8 top | 15.69 | 25 | 0.14 | 84.17 | 2.09 | | | | | | | |
| #9 bottom | 2.12 | 25 | 97.88 | 0.00 | 2.50 | 4.92 | 2.45 | 0.51 | 1.96 | 49.81 | 10.39 | 39.79 |
| #9 top | 18.94 | 25 | 0.16 | 80.90 | 2.42 | | | | | | | |
| #10 bottom | 3.48 | 25 | 96.52 | 0.00 | 2.55 | 5.05 | 2.47 | 0.44 | 2.14 | 48.82 | 8.71 | 42.47 |
| #10 top | 14.05 | 25 | 0.16 | 85.79 | 2.50 | | | | | | | |
| #11 bottom | 3.06 | 25 | 96.94 | 0.00 | 2.34 | 4.99 | 2.27 | 0.50 | 2.22 | 45.57 | 9.95 | 44.48 |
| #11 top | 16.04 | 25 | 0.21 | 83.76 | 2.65 | | | | | | | |
| #12 bottom | 5.68 | 25 | 94.32 | 0.00 | 1.56 | 5.19 | 1.48 | 0.81 | 2.90 | 28.49 | 15.56 | 55.95 |
| #12 top | 19.82 | 25 | 0.20 | 79.99 | 3.63 | | | | | | | |

Figure 1:
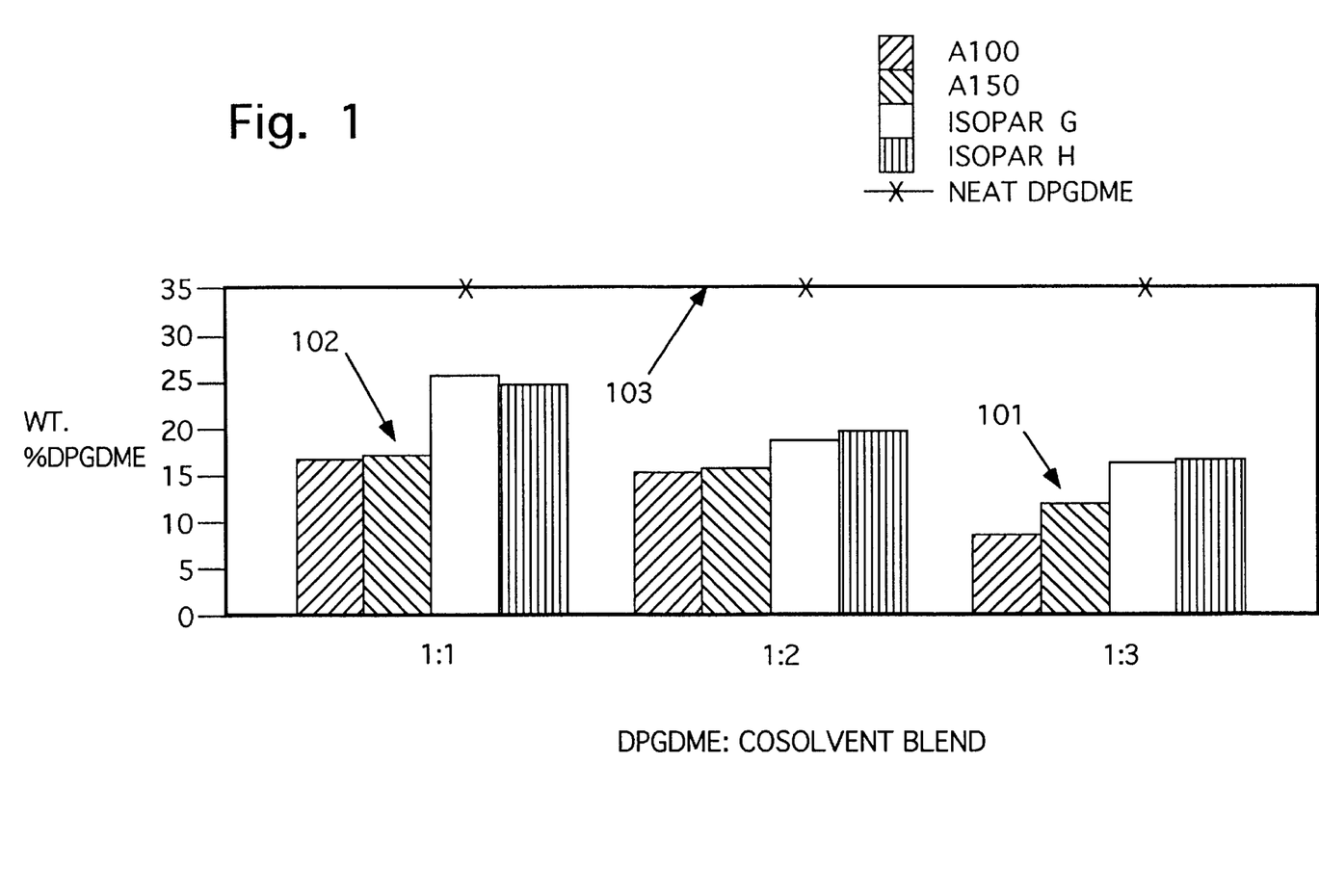
FIG. 1 shows the solubility of DPGDME in the aqueous layer from several reflux solvent and water blends at 25° C.

Respective to separation, purification, recovery, and return of the reflux solvent in polyester and alkyd resin preparation, FIGS. 1 through 4 depict the results of solubility experiments performed at 25° C. and at 60° C. FIG. 1 shows the solubility of DPGDME in the aqueous layer from several reflux solvent and water blends at 25° C. Line 103 shows what the solubility of DPGDME would be in water if the aromatic petroleum distillate solvent were not present. As shown in FIG. 1, the aromatic petroleum distillate solvent preferentially solvates and extracts the DPGDME from the aqueous phase at 25° C. DPGDME is more effectively partitioned into the organic phase when more aromatic petroleum distillate solvent is present. For example, a 3:1 blend of Aromatic 150:DPGDME shows a weight percentage (at 101) of DPGDME in water of about 10% while a 1:1 blend of Aromatic 150:DPGDME shows a weight percentage (at 102) of DPGDME in water of above 15%—the improvement is indicated with the increase of aromatic petroleum distillate solvent respective to the DPGDME in the reflux solvent. In all cases, blended DPGDME, aromatic petroleum distillate solvent, and water show a benefit over neat DPGDME in water (line 103) which should be apparent.

Figure 2:
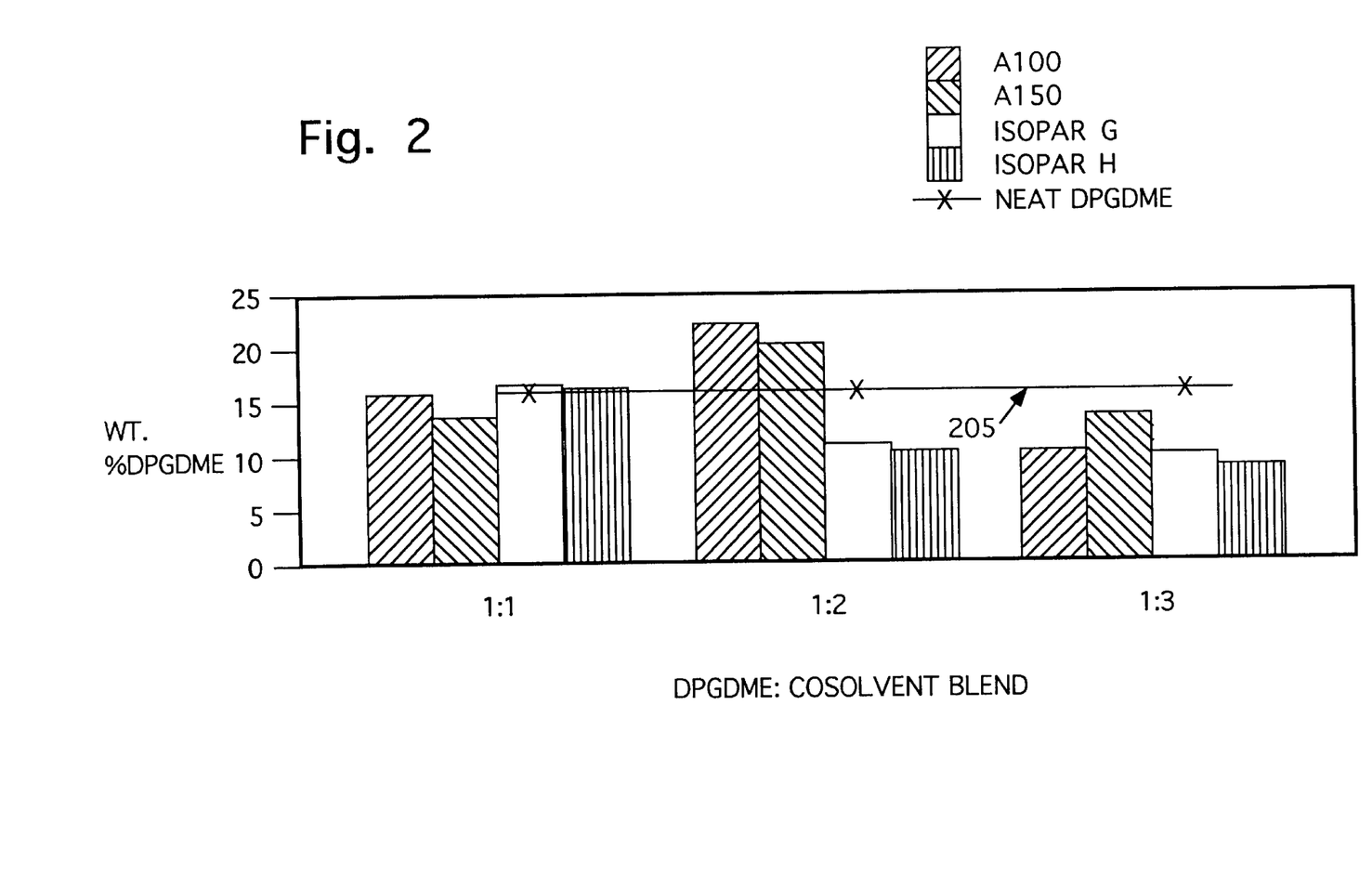
FIG. 2 shows the solubility of DPGDME in the aqueous layer from several reflux solvent and water blends at 60° C.

FIG. 2 shows the solubility of DPGDME in the aqueous layer from several reflux solvent and water blends at 60° C. A comparison of values in FIG. 1 and FIG. 2 also demonstrates that heating of condensed reflux solvent and water (as would be needed for neat DPGDME as noted from a comparison of the 35% at 25° C. shown at line 103 and the 16% at 60° C. shown at line 205) is not needed to minimize DPGDME in a discharge stream.

Figure 3:
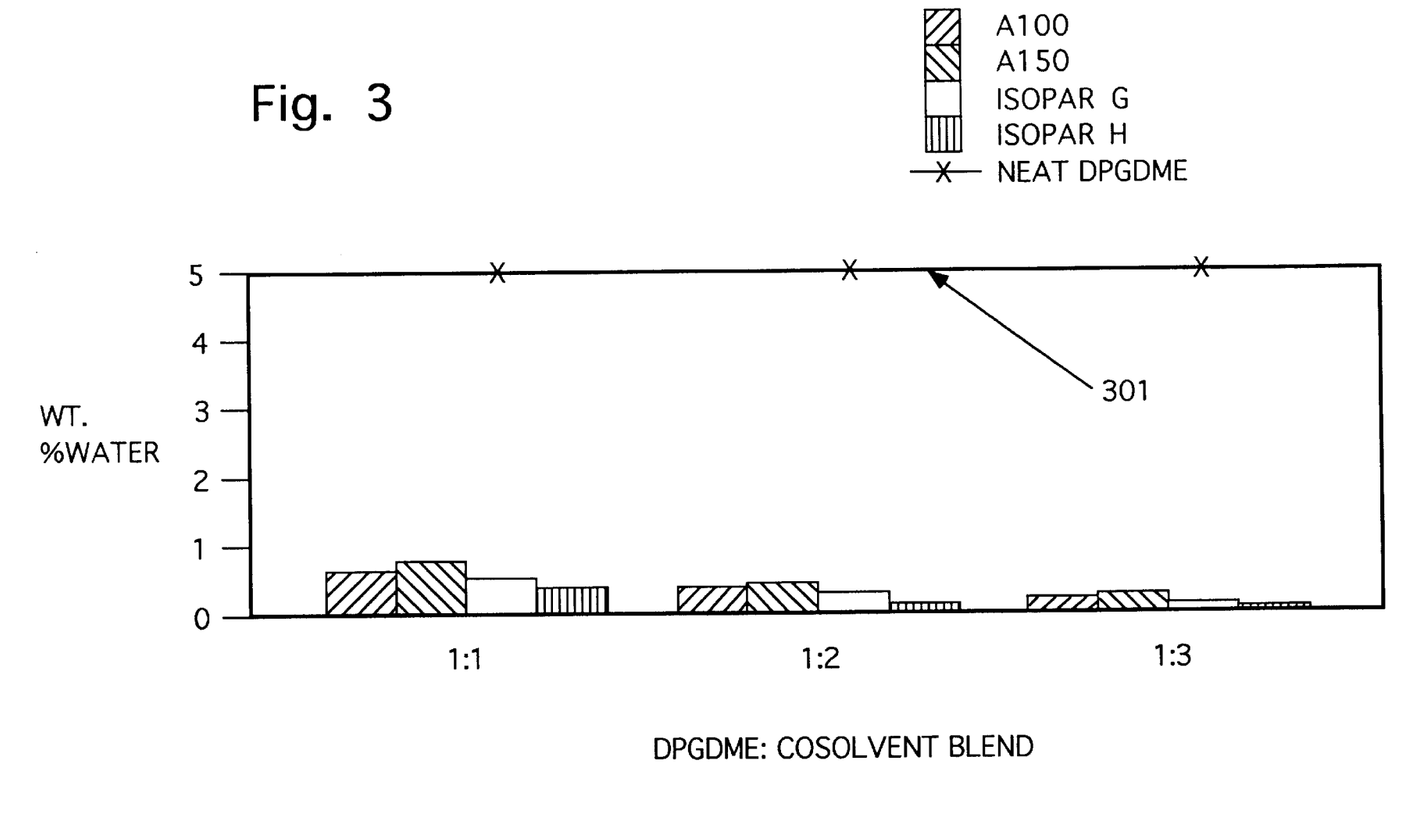
FIG. 3 shows solubility of water in the organic layer from several reflux solvent and water blends at 25° C.
Figure 4:
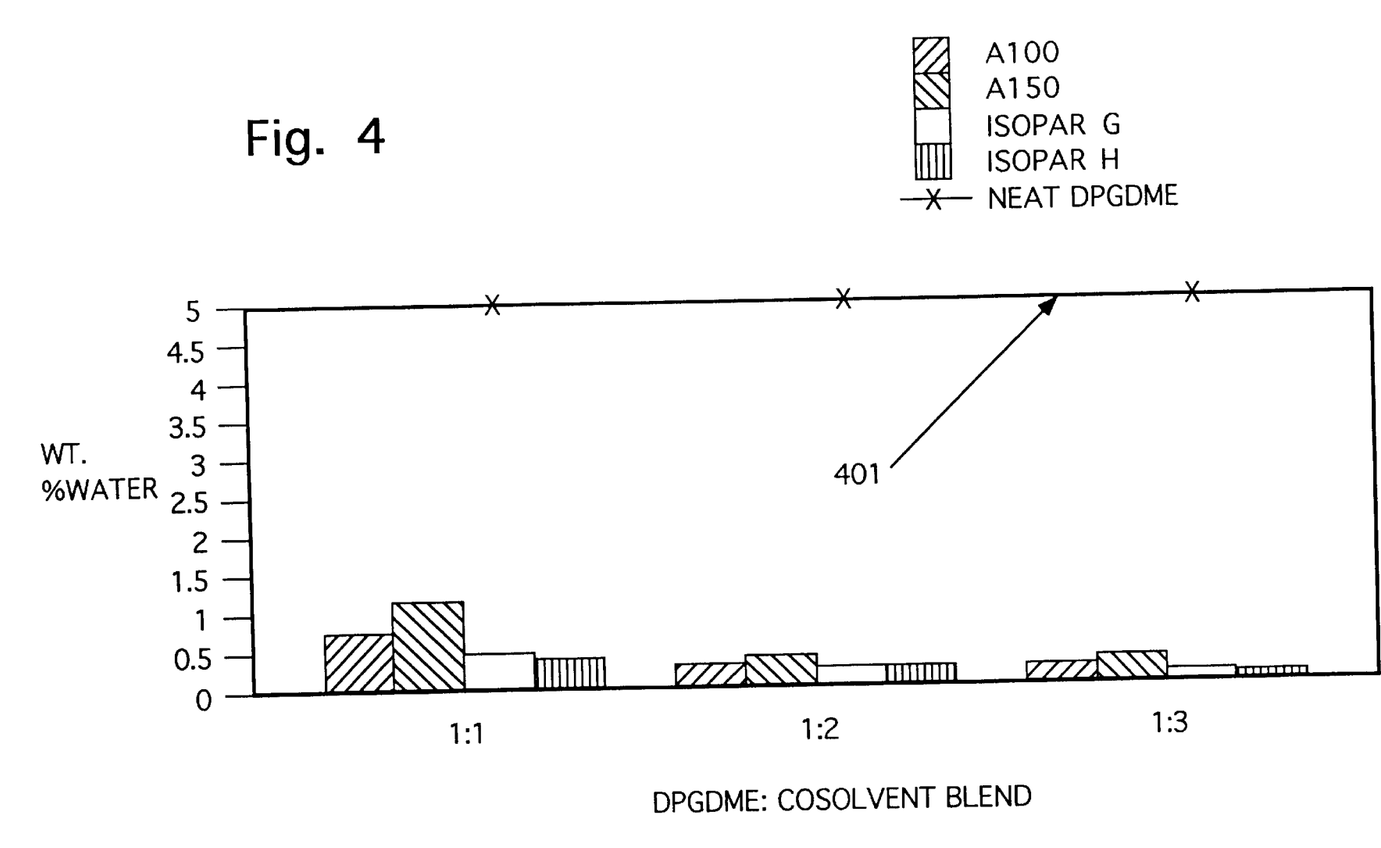
FIG. 4 shows solubility of water in the organic layer from several reflux solvent and water blends at 60° C.

FIG. 3 shows solubility of water in the organic layer from several reflux solvent and water blends at 25° C. FIG. 4 shows solubility of water in the organic layer from several reflux solvent and water blends at 60° C. These figures readily demonstrate the beneficial effect of petroleum distillate solvent and DPGDME blends over pure (neat) DPGDME respective to minimization of water which is returned to the reactor. In all cases, the solubility of water in the organic layer is clearly shown as less than 2 percent where the lines showing the behavior of neat DPGDME with water (301 and 401) indicate more than double that level.

Example preparation of alkyd polyester according to the present invention.

The reaction apparatus for preparation of an alkyd polyester according to the present invention utilized a 500-ml Pyrex resin kettle equipped with a thermocouple well, a heating mantle, a glass stopper, a solvent addition funnel, an air-driven agitator, and a single-piece distillation unit. The distillation unit included a distillation head; an overhead condenser; a fraction cutter with nitrogen purge intake and oil bubbler; and a water trap with a built-in, ball-joint, side arm connector located just above the graduations on the trap. The water trap functioned to enable decantation of the vaporous water and reflux solvent (removed from the condensation polymerization) into water and recovered reflux solvent. The distillation unit was attached to the Pyrex resin kettle with a glass adapter also equipped with a similar (respective to the water trap) side arm connector. The two side arms were connected with a ball-joint tubing adapter. This connection functioned to enable the top layer (recovered reflux solvent) in the trap to drain back down into the reactor, thereby permitting continuous recycling of the reflux solvent throughout the course of the condensation polymerization reaction exercise.

The stopper was removed; and the reactor was purged with nitrogen for 10 minutes before adding 193.37 g (0.68 mole) stearic acid, 148.39 g (1.0 mole) phthalic anhydride, and 99.10 g (1.08 mole) glycerine into the resin kettle. The stopper was repositioned and the nitrogen purge continued to establish a nitrogen blanket. The addition funnel was then charged with 27.15 g of a 50/50 blend of DPGDME and Aromatic 100. The water trap was charged with 16.17 g of the same 50/50 blend. The heating mantle was connected to a temperature controller and an affiliated control thermocouple placed inside the thermowell. The temperature controller was activated and a setpoint of 230° C. was defined for the region of the resin kettle being measured by the thermocouple. The agitator was activated as soon as the temperature had increased within the resin kettle and all the reactants had liquefied. A first drop of water was detected in the water trap when the resin kettle temperature reached about 200 C. By the time the resin kettle temperature reached 230° C., enough water had distilled over into the water trap as to permit the decanted solvent layer to reach the side arm connection and begin draining into the reactor. Some of the water in the water trap was drained occasionally through the water trap's bottom valve in order to prevent the water layer from reaching the side arm, but enough water was kept in the water trap to minimize the volume of solvent required to maintain a continuous reflux. If needed to maintain reflux, additional reflux solvent was added in small increments from the addition funnel. The reaction was allowed to proceed for 7 hours at 230° C. and then the resin kettle was allowed to cool to about 80 C. and the product transferred into a tared glass bottle. Weight of resin and recovered reflux solvent was 441.06 g. Total water recovered was 30 g. Analysis of the resin demonstrated a low acid number (<6) and a molecular weight distribution matching that of resins prepared using the same recipe with xylene as the reflux solvent.

We claim:

1. A condensation polymerization reflux solvent admixture comprising:

dipropylene glycol dimethyl ether having a weight percentage in said admixture between about 15 percent to about 60 percent; and a second fluid which is an aromatic petroleum distillate solvent characterized as having an essential preponderance of aromatic distillates and having a boiling temperature between about 136° C. to about 232° C.

2. A condensation polymerization reflux solvent admixture comprising:

a diether described by the formula $R_1$—O—$(CH_2$—$CHR_2$—$O)_n$—$R_1$ having a weight percentage in said admixture between about 15 percent to about 60 percent, where $R_1$ is independently selected from $C_1$–$C_6$, $R_2$=$CH_3$ or $C_2H_5$, and n=1–3; and a second fluid which is an aromatic petroleum distillate solvent characterized as having an essential preponderance of aromatic distillates and having a boiling temperature between about 136° C. to about 232° C.;

wherein said admixture has an autoignition temperature greater than about 300° C. and said admixture does not solubilize water to above a concentration of about 2 weight percentage of water in the weight of said admixture and said water.

3. The condensation polymerization reflux solvent admixture of either claim 1 or claim 2 wherein said second fluid is selected from the group consisting of the compounds of propylbenzene; 1-ethyl-3-methylbenzene; 1-ethyl-4-methylbenzene; mesitylene; 1-ethyl-2-methylbenzene; 1,2,4-trimethylbenzene; tert-butylbenzene; 1,2,3-trimethylbenzene; isobutylbenzene; m-cymene; sec-butylbenzene; p-cymene; o-isopropyltoluene; 1,2-diethylbenzene; butylbenzene; 1,4-diethylbenzene; 2,5-dimethylcumene; 1,2,4,5-tetramethylbenzene; 1,2,3,5-tetramethylbenzene; and a blended admixture of any of said compounds.

4. The condensation polymerization reflux solvent admixture of claim 1 wherein said dipropylene glycol dimethyl ether is 5. The condensation polymerization reflux solvent admixture of claim 1 wherein said dipropylene glycol dimethyl ether is 6. A method for preparing a condensation polymerization reflux solvent, the method comprising admixing:

dipropylene glycol dimethyl ether having a weight percentage in said admixture between about 15 percent to about 60 percent; and a second fluid which is an aromatic petroleum distillate solvent characterized as having an essential preponderance of aromatic distillates and having a boiling temperature between about 136° C. to about 232° C.

7. A method for preparing a condensation polymerization reflux solvent, the method comprising admixing:

diether described by the formula $R_1$—O—$(CH_2$—$CHR_2$—O$)_n$—$R_1$ having a weight percentage in said admixture between about 15 percent to about 60 percent, where $R_1$ is independently selected from $C_1$–$C_6$, $R_2$=$CH_3$ or $C_2H_5$, and n=1–3; and a second fluid which is an aromatic petroleum distillate solvent characterized as having an essential preponderance of aromatic distillates and having a boiling temperature between about 136° C. to about 232° C.;

wherein said admixture has an autoignition temperature greater than about 300° C. and said admixture does not solubilize water to above a concentration of about 2 weight percentage of water in the weight of said admixture and said water.

8. The method for preparing a condensation polymerization reflux solvent of either claim 6 or claim 7 wherein said second fluid is selected from the group consisting of the compounds of propylbenzene; 1-ethyl-3-methylbenzene; 1-ethyl-4-methylbenzene; mesitylene; 1-ethyl-2-methylbenzene; 1,2,4-trimethylbenzene; tert-butylbenzene; 1,2,3-trimethylbenzene; isobutylbenzene; m-cymene; sec-butylbenzene; p-cymene; o-isopropyltoluene; 1,2-diethylbenzene; butylbenzene; 1,4-diethylbenzene; 2,5-dimethylcumene; 1,2,4,5-tetramethylbenzene; 1,2,3,5-tetramethylbenzene; and a blended admixture of any of said compounds.

9. The method of claim 6 wherein said dipropylene glycol dimethyl ether is

10. The method of claim 6 wherein said dipropylene glycol dimethyl ether is

11. A heterogeneous azeotrope having:

dipropylene glycol dimethyl ether in a weight percentage between about 7 percent to about 20 percent of the azeotrope;

water in a weight percentage between about 40 percent to about 60 percent of the azeotrope; and a third fluid as the essential remainder of said heterogeneous azeotrope which is an aromatic petroleum distillate solvent characterized as having an essential preponderance of aromatic distillates and having a boiling temperature between about 136° C. to about 232° C.

12. The heterogeneous azeotrope of claim 11 wherein said third fluid is selected from the group consisting of the compounds of propylbenzene; 1-ethyl-3-methylbenzene; 1-ethyl-4-methylbenzene; mesitylene; 1-ethyl-2-methylbenzene; 1,2,4-trimethylbenzene; tert-butylbenzene; 1,2,3-trimethylbenzene; isobutylbenzene; m-cymene; sec-butylbenzene; p-cymene; o-isopropyltoluene; 1,2-diethylbenzene; butylbenzene; 1,4-diethylbenzene; 2,5-dimethylcumene; 1,2,4,5-tetramethylbenzene; 1,2,3,5-tetramethylbenzene; and a blended admixture of any of said compounds.

13. The heterogeneous azeotrope of either claim 11 or claim 12 wherein said dipropylene glycol dimethyl ether is 14. The heterogeneous azeotrope of either claim 11 or claim 12 wherein said dipropylene glycol dimethyl ether is 15. A method of preparing a polyester comprising steps of:

reactively condensing together in a reaction zone an at least difunctional acid and an at least difunctional alcohol in the presence of the condensation polymerization reflux solvent admixture of any of claims 1, 2, 4, or 5; and azeotropically distilling from said reaction zone said solvent admixture and any water formed during said reactively condensing.

16. A method of preparing a polyester comprising steps of:

reactively condensing together in a reaction zone an at least difunctional acid and an at least difunctional alcohol in the presence of the condensation polymerization reflux solvent admixture of claim 3; and azeotropically distilling from said reaction zone said solvent admixture and any water formed during said reactively condensing.

17. The method of claim 15 wherein said at least difunctional acid is a reactive derivative of said at least difunctional acid and wherein said reactive derivative and said at least difunctional alcohol are reactively condensed together.

18. The method of claim 16 wherein said at least difunctional acid is a reactive derivative of said at least difunctional acid, wherein said reactive derivative and said at least difunctional alcohol are reactively condensed together.

19. The method of claim 15 wherein said at least difunctional acid is a polybasic acid, wherein said at least difunctional alcohol is a dihydric alcohol, and wherein said polyester is an alkyd resin.

20. The method of claim 16 wherein said at least difunctional acid is a polybasic acid, wherein said at least difunctional alcohol is a dihydric alcohol, and wherein said polyester is an alkyd resin.

21. The method of claim 19 wherein said polybasic acid is phthalic anhydride.

22. The method of claim 20 wherein said polybasic acid is phthalic anhydride.

23. The method of claim 19 wherein said polybasic acid is isophthalic acid.

24. The method of claim 20 wherein said polybasic acid is isophthalic acid.

* * * * *

UNITED STATES PATENT AND TRADEMARK OFFICE
CERTIFICATE OF CORRECTION

PATENT NO. : 5,854,340  
DATED : December 29, 1998  
INVENTOR(S) : Felipe A. Donate et al.

Page 1 of 1

It is certified that error appears in the above-identified patent and that said Letters Patent is hereby corrected as shown below:

Column 15,
Line 7, before the word diether insert therefore -- a --

Signed and Sealed this

Twenty-seventh Day of November, 2001

Attest:

NICHOLAS P. GODICI  
Attesting Officer     Acting Director of the United States Patent and Trademark Office